United States Patent
Herber et al.

(10) Patent No.: US 7,211,211 B2
(45) Date of Patent: May 1, 2007

(54) METHOD FOR MANUFACTURING A SHOE

(75) Inventors: Karl-Heinrich Herber, Sinntal-Mottgers (DE); Erwin Schmalbach, Grebenhain-Crainfeld (DE)

(73) Assignee: ALSA GmbH, Steinau-Uerzell (DE)

( * ) Notice: Subject to any disclaimer, the term of this patent is extended or adjusted under 35 U.S.C. 154(b) by 138 days.

(21) Appl. No.: 10/495,170

(22) PCT Filed: Dec. 13, 2002

(86) PCT No.: PCT/DE02/04578

§ 371 (c)(1), (2), (4) Date: Aug. 18, 2004

(87) PCT Pub. No.: WO03/049933

PCT Pub. Date: Jun. 19, 2003

(65) Prior Publication Data

US 2004/0255405 A1 Dec. 23, 2004

(30) Foreign Application Priority Data

Dec. 13, 2001 (DE) ................. 101 61 164

(51) Int. Cl.
  *B29C 39/18* (2006.01)
(52) U.S. Cl. ............... 264/244; 264/275; 264/263
(58) Field of Classification Search ............ 264/244, 264/275, 263
See application file for complete search history.

(56) References Cited

U.S. PATENT DOCUMENTS 2,256,329 A * 9/1941 Rollmann et al. .......... 264/244
3,345,763 A * 10/1967 Rollman ....................... 36/14
4,032,611 A * 6/1977 Fukuoka ..................... 264/244

FOREIGN PATENT DOCUMENTS

| CH | 343 844 | 12/1959 |
|---|---|---|
| DE | 259130 | 8/1899 |
| DE | 1529894 | 3/1970 |
| DE | 264146 | 1/1989 |
| DE | 3640561 | 12/1989 |
| DE | 19511942 | 10/1996 |
| DE | 19653849 | 6/1999 |
| EP | 0 734 844 | 10/1996 |
| EP | 1 264 554 | 12/2002 |
| FR | 1 191 875 | 10/1959 |
| FR | 1.403.012 | 5/1965 |
| FR | 2 762 488 | 6/1977 |
| FR | 2389346 | 12/1978 |
| JP | 11138660 | 5/1999 |

* cited by examiner

Primary Examiner—Edmund H. Lee
(74) Attorney, Agent, or Firm—Crowell & Moring LLP

(57) ABSTRACT

In order to produce a shoe, an outsole is firstly inserted in a hollow mold. This outsole has fixing means, which are formed by upwardly projecting neps and which fix a shoe upper of the shoe inside the hollow mold. The hollow mold is covered on the top by an upper mold, which rests on an upper sole while leaving a free space open between its edge and a lateral wall of the hollow mold. A wedge-shaped element is inserted into said free space from the top. This element leaves a narrow gap open through which a cork-latex mixture can exit during expansion.

3 Claims, 1 Drawing Sheet

METHOD FOR MANUFACTURING A SHOE

BACKGROUND AND SUMMARY OF THE INVENTION

The invention relates to a method for manufacturing a shoe in which parts of an upper protrude into a hollow mold that serves to produce a shoe bottom and are held against a sidewall of the hollow mold by fixation means, such that the parts of the upper are connected with the shoe bottom after a cork particle-containing or similar material has been poured into the mold and the upper form has been set in place. The invention further relates to a shoe manufactured according this method.

A method of the above-described type is disclosed in German Laid-Open Publication DE 195 11 942 A1. The hollow mold to be used in this method has pockets and holding frames which serve as fixation means for the lateral parts of an upper and hold these lateral parts until the shoe bottom material has been placed into the mold and has bonded to the lateral parts. Because of the pockets and the holding frame the design of the hollow mold is very complex and therefore costly. A further drawback is that the shape of the pockets and the holding frame determine the shape of the upper, so that the hollow mold cannot be used for differently styled shoes. If the shoe bottom material used for the shoe manufactured according to this method is not sufficiently abrasion resistant, then an outer sole is bonded to the underside of the shoe bottom. This bonding process is labor intensive, however, and often undesirable because solvents are released, and the bonding layer strongly reduces the vapor permeability of the shoe bottom.

Manufacturing a shoe bottom in a closed hollow mold from a cork particle-containing material—particularly a cork-latex mixture—involves the problem that the compression of the material, which occurs when the hollow mold is heated, causes a partial separation of the suspension. To prevent this, the material must be able to escape from the hollow mold in a controlled fashion, but this involves the risk of soiling either the material of the shoe's upper or the cover sole. Furthermore, the leakage of the material makes it necessary to clean the leakage areas as thoroughly as possible, which requires additional process steps. The aforementioned Laid-Open Publication DE 195 11 942 A1 does not address the separation problem of the cork-latex mixture or the avoidance of compression of the material within the closed mold.

The object of the invention is to develop a method of the initially described type, which uses a particularly simple hollow mold and prevents the separation of the shoe bottom material by avoiding compression within the hollow mold without the risk of soiling parts of the shoe. A further object of the invention is to create a shoe that can be manufactured according to this method.

According to the invention, the first object is attained by using an upper form configured to leave a clearance between its edge and the sidewall of the hollow mold and by inserting a cone plate into this clearance after the upper form has been placed, such that the cone plate tapers toward the interior of the hollow mold and on the inside presses the upper against the sidewall of the hollow mold while leaving a narrow gap to the edge of the upper form.

The use of the cone plate achieves two ends. On the one hand, the area of the upper is reliably pressed against the side wall, so that there is no risk of shoe bottom material rising between the exterior of the upper and the sidewall of the hollow mold. On the other hand, the cone plate leaves a gap between the upper form and the cone plate through which the material can escape in a controlled manner without soiling the shoe. Furthermore, the leaked material can be easily removed from the finished shoe.

In a further particularly advantageous refinement of the method according to the invention, after the areas of the upper have been inserted into the mold and the material forming the shoe bottom has been filled in, a cover sole is placed onto this material and the upper form is inserted, such that when the cone plate is inserted, the cover sole fits against the upper form with an edge folded up toward the exterior of the upper form. As a result, the upper is pressed against the top edge of the sidewall of the hollow mold and the narrow gap is created between the cone plate and the turned-up edge of the cover sole. After the shoe has been removed from the hollow mold, the turned-up edge of the cover sole is neatly trimmed.

This procedure makes it possible to completely exclude any soiling of the upper and the cover sole by leaking sole material. Moreover, the leaked material can be easily and neatly trimmed together with the edge of the cover sole.

In a further refinement of the method according to the invention, the parts of the upper that protrude into the hollow mold are fixed not only by the cone plate at the top edge of the sidewalls of the hollow mold but are held against the sidewalls also at their lower end. An outer sole, placed into the hollow mold before the material forming the shoe bottom is filled in, holds the lower ends of the parts of the upper that are protruding into the hollow mold against the sidewall of the hollow mold by fixation means provided on the outer sole.

It is particularly advantageous to use a cork-latex mixture as the material for the shoe bottom.

The second of the above-described objects, namely the creation of a shoe with an outer sole covering a shoe bottom and an upper connected with the shoe bottom, is attained according to the invention by the upper extending to the outer sole and the outer sole having upwardly projecting fixation means on the inside of the upper. In the finished shoe the material of the shoe bottom covers the fixation means. In such a shoe, the fixation means required for the simplified production of the shoe are not visible and do not affect the wearing comfort of the shoe. The fixation means can nevertheless be very simple in their design and enable a simple insertion of the upper when the shoe is being manufactured.

In a particularly simple design, the fixation means are formed by upwardly projecting nubs that extend parallel to the edge of the outer sole. Such nubs fix the upper and at the same time readily allow the shoe bottom material to flow up to and against the material of the upper.

BRIEF DESCRIPTION OF THE DRAWINGS

The invention allows various embodiments. To illustrate its basic principle, reference is made to the drawing in which.

DETAILED DESCRIPTION OF THE DRAWINGS

Figure 1:
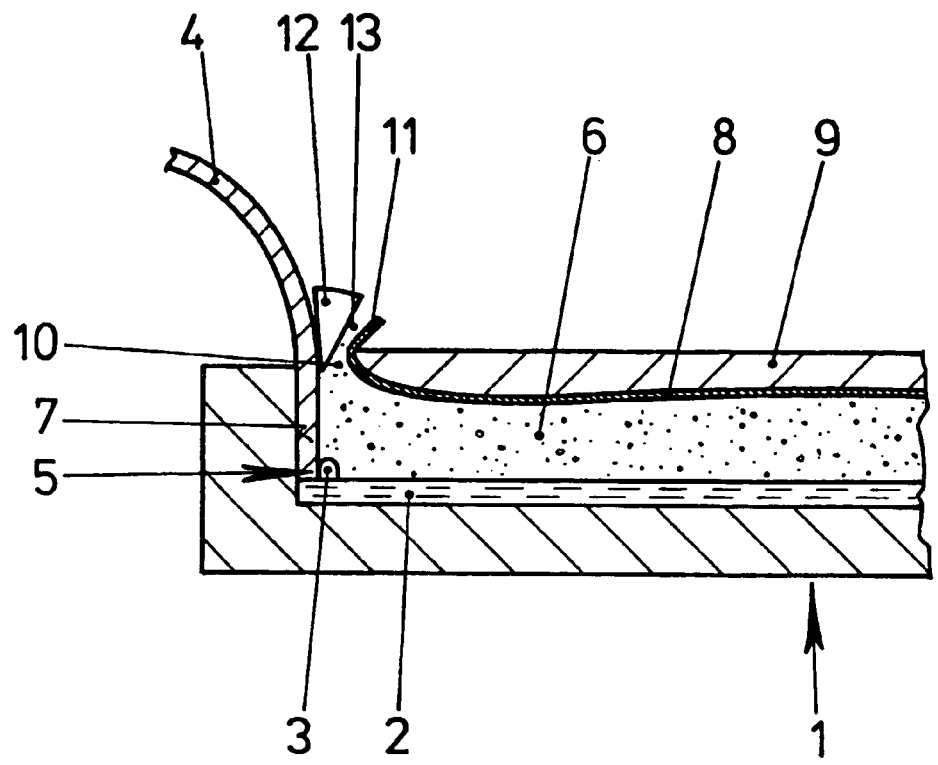
FIG. 1 is a cross section of a portion of a hollow mold wherein parts of a shoe to be manufactured are inserted.

FIG. 1 shows a hollow mold 1 into which an outer sole 2 made of rubber, for example, is first inserted from the top. This outer sole 2 has exterior upwardly protruding nubs 3 in individual areas, which are spaced closely to the outer edge.

These nubs 3 form the fixation means 5 for an upper 4. A shoe bottom 6 made, for example, from a cork-latex mixture connects the outer sole 2 to the upper 4.

To manufacture the shoe, the outer sole 2 is first placed into the hollow mold 1. Thereafter the upper 4, e.g., the straps of a sandal, is inserted into the hollow mold in such a way that it extends along the inside of a side wall 7 of the hollow mold and is held against this side wall 7 by the fixation means 5. To form the shoe bottom 6, the cork-latex mixture is subsequently filled into the hollow mold 1 and an upper form 9 is placed onto this shoe bottom material with an interposed cover sole 8. The upper form 9 is dimensioned in such a way that a clearance 10 remains between it and the side wall 7 of the hollow mold 1, which is bounded on the one side by the upper 4 and on the other side by an upturned edge 11 of the cover sole 8. A cone plate 12 tapering in downward direction is then inserted into this clearance 10. The cone plate 12 presses the upper 4 outwardly against the sidewall 7 and is dimensioned to leave a narrow gap 13 between it and the edge 11 of the cover sole 8, which fits against the upper form 9. Through this gap 13, cork-latex mixture can escape in upward direction without soiling the upper 4 or the cover sole 8.

After the shoe has been removed from the mold, the edge 11 is trimmed together with the cork-latex mixture that had leaked behind it, so that a clean shoe is obtained.

Figure 2:
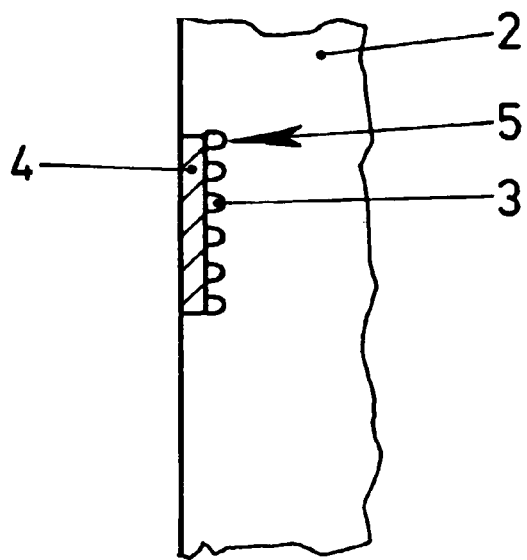
FIG. 2 is a top view of a portion of an outer sole of the shoe.

The top view of FIG. 2 shows a portion of the outer sole 2 with the fixation means 5 formed by the nubs 3. It may be seen that in this embodiment, given by way of example, the fixation means consist of six nubs 3 arranged parallel to the edge of the outer sole. The upper 4 is inserted between these nubs 3 and the edge of the outer sole 2. The spacing between the nubs 3 is large enough so that the material of the shoe bottom 6 reaches the upper 4 in the area of the nubs 3 and thereby fixes the upper to the shoe bottom 6 in this area as well as in the area above the nubs 3.

LIST OF REFERENCE NUMERALS

1 hollow mold
2 outer sole
3 nubs
4 upper
5 fixation means
6 shoe bottom
7 sidewall
8 cover sole
9 upper form
10 clearance
11 edge
12 cone plate
13 gap

The invention claimed is:

1. A method for manufacturing a shoe comprising inserting an outer sole into a hollow mold used to manufacture a shoe bottom and disposing an upper in the hollow mold such that parts of said upper protrude into said hollow mold and are held against a sidewall of said hollow mold by a fixation means provided on the outer sole; filling a cork particle-containing material into said mold to form the shoe bottom; placing an upper form over said cork particle-containing material; whereby parts of said upper bond to the shoe bottom after said cork particle-containing material has been filled into said mold and said upper form has been placed; wherein said upper form leaves a clearance between its edge and the sidewall of the hollow mold; and inserting a wedge into the clearance after the upper form has been placed wherein said wedge tapers in the direction of the interior of the hollow mold and presses the upper against the sidewall of the hollow mold on the inside while leaving a narrow gap to the edge of the upper form.

2. A method as claimed in claim 1, further comprising placing a cover sole onto the material after the parts of the upper have been inserted and the material forming the shoe bottom has been filled into the mold and setting the upper form in place such that the cover sole fits against the upper form with an edge turned up toward the exterior of the upper form, then inserting the wedge such that the upper is pressed against the top edge of the sidewall of the hollow mold and the narrow gap is formed between the wedge and the turned-up edge of the cover sole, and trimming the turned-up edge of the cover sole after the shoe has been removed from the mold.

3. A method as claimed in claim 1, wherein a cork-latex mixture is used as the material for the shoe bottom.

* * * * *